United States Patent [19]
DeYoung

[11] 3,802,643
[45] Apr. 9, 1974

[54] STRAND TENSION-CONTROLLING AND SPOOL RELEASE ACTUATOR MECHANISM

[75] Inventor: Simon Arden DeYoung, Ravenna, Ohio

[73] Assignee: Karg Machine Products, Inc., Tallmadge, Ohio

[22] Filed: May 14, 1973

[21] Appl. No.: 360,177

Related U.S. Application Data

[63] Continuation-in-part of Ser. No. 193,128, Oct. 27, 1971, Pat. No. 3,756,533.

[52] U.S. Cl......................... 242/156, 87/22, 87/57
[51] Int. Cl................................................. B65h 59/04
[58] Field of Search............ 242/156, 156.2, 129.8, 242/45; 87/21, 22, 55, 56, 57, 61

[56] References Cited
UNITED STATES PATENTS

| | | |
|---|---|---|
| 1,671,976 | 6/1928 | Avery ............................ 242/156.2 |
| 1,733,834 | 10/1929 | Steele ............................ 242/156.2 |
| 2,879,011 | 3/1959 | Nelson ........................... 242/156.2 |
| 2,988,300 | 6/1961 | Woods et al. .................... 242/156.2 |
| 3,425,315 | 2/1969 | Kaufmann ............................. 87/22 |

Primary Examiner—Stanley N. Gilreath
Attorney, Agent, or Firm—Mack D. Cook, II

[57] ABSTRACT

Mechanism for controlling the tension of a strand from a spool of strand material on a strand fabricating machine having a "work center" toward which a tensioned strand is incrementally released. The spool is carried by a spool holder having a base housing a spool release mechanism. The mechanism of the invention provides a modulated actuator means permitting of a smoother, more even, or steadier increase in strand tension up to a desired value, and thereafter releasing the spool for rotation.

1 Claim, 1 Drawing Figure

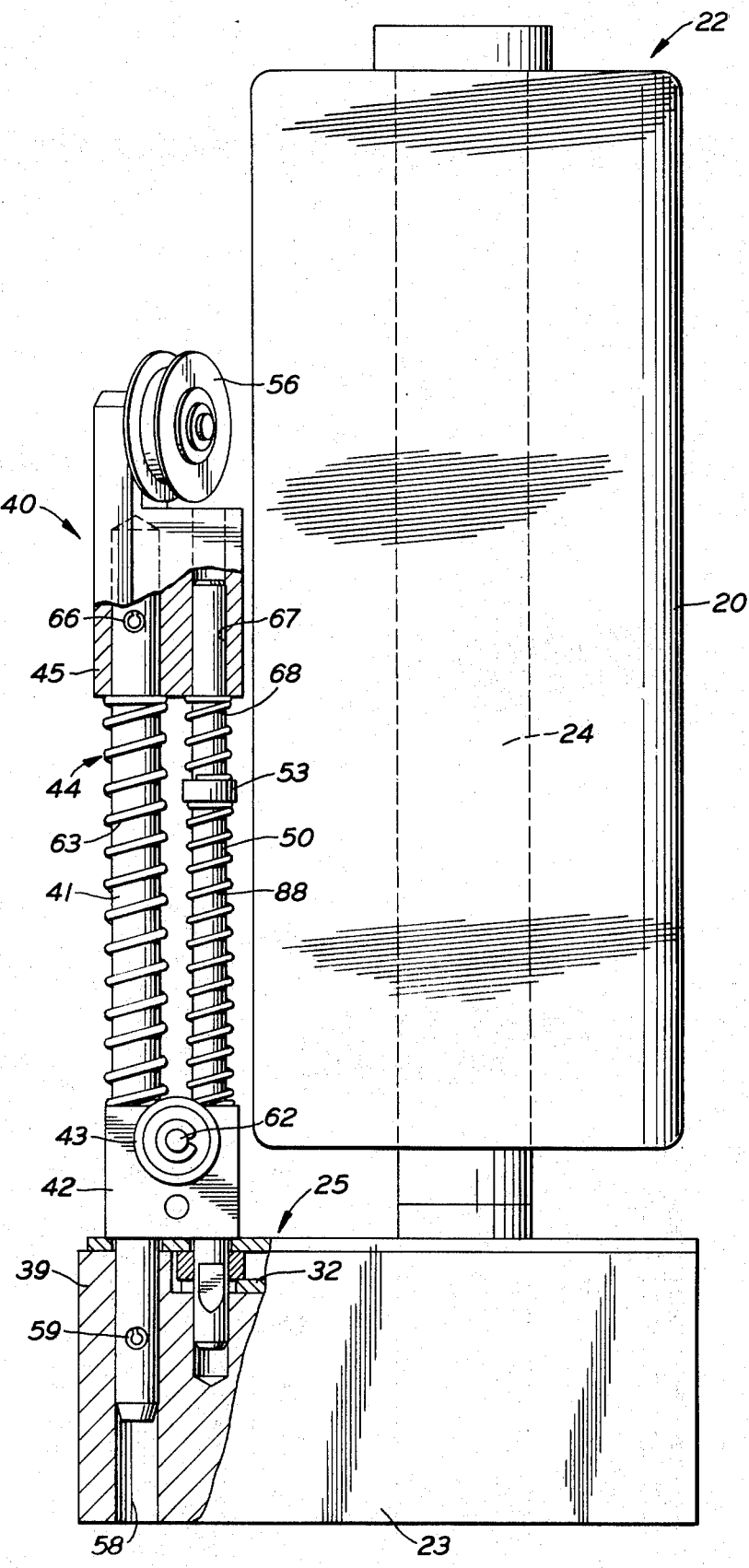

STRAND TENSION-CONTROLLING AND SPOOL RELEASE ACTUATOR MECHANISM

CROSS-REFERENCE TO RELATED APPLICATIONS

The subject matter of this invention is a continuation-in-part of the subject matter of co-pending application Ser. No. 193,128, filed Oct. 27, 1971, now U.S. Pat. No. 3,756,533,.

BACKGROUND OF THE INVENTION

The present invention is an improvement to the subject matter of co-pending application Ser. No. 193,128, filed Oct. 27, 1971, now U.S. Pat. No. 756,533, which provides a strand tension-controlling and spool release actuator mechanism, for a spool holder having a base adapted for mounting on a strand fabricating machine with a "work center," a spindle extending from the base for carrying the spool of strand material, a deck projecting laterally of the spindle, and a spool release mechanism having means within the base for retarding rotation of the spool on the spindle, which means is actuated by selective rotational movement of a control flange projecting laterally of the base.

The actuator mechanism of U.S. Pat. No. 3,756,533 has a support rod carried by the deck and extending parallel to the spindle, a slide means movable along the support rod and carrying a strand guide, and a first resilient means biasing the slide means for movement along the support rod.

The actuator mechanism further has a guide block attached to the support rod above the deck and carrying a reciprocating actuator rod having a fixed flange thereon below the guide block and in position to be actuated by the slide means, the actuator rod extending from the guide block to intersect and engage the control flange of the spool release mechanism.

There is also a stationary strand guide located adjacent the guide block and generally medially of the spool of strand material on the spindle.

In the actuator mechanism of U.S. Pat. No. 3,756,533 a moving strand from the spool, when trained around the stationary strand guide and then around the movable strand guide and then progressing towards the "work center" of the strand fabricating machine, will move the slide means into contact with the fixed flange on the actuator rod so that the actuator rod will engage and move the control flange to release the frictional locking force against rotation of the spool. The movement of the actuator rod to release the frictional force is toward the guide block. Movement of the actuator rod away from the guide block will initiate development of the frictional locking force.

The actuator mechanism of U.S. Pat. No. 3,756,533 has a so-called "second resilient means" (with the reference numeral 54) intended to apply a bias or force for movement of the actuator rod in relation to the guide block after the spool has been released.

It has been found that under certain conditions, such as encountered during the fabrication of metal strands, the movement of the slide means (42) carrying a strand guide (43) and contacting a fixed flange (53) on the actuator rod (50), causes a rapid increase of tension in the strand. In the event of a rapid increase of strand tension, jerky and irregular strand fabrication may result, and under certain conditions strand breakage may occur. Also, the metal-to-metal contact of the actuating surfaces may cause a high noise level of operation or excessive wear, particularly when the surfaces approach at high velocity.

The present invention provides an improved modulation for the actuator means permitting of a smoother, more even or steadier increase in strand tension up to a desired value, and then, without excessive noise or wear of the components, release of the frictional force against rotation of the spool.

SUMMARY OF THE INVENTION

It is an object of the present invention to provide an improved mechanism for controlling the tension of strands from spools of strand material on a strand fabricating machine having a "work center" toward which a tensioned strand is incrementally released.

It is a further object of the present invention to provide a modulated actuator means permitting of a smoother, more even, or steadier increase in strand tension up to a desired value, and then, without excessive noise or wear of the components, release of the frictional locking force against rotation of the spool.

These and other objects of the present invention, and the advantages thereof, will be apparent in view of the following Detailed Description of the Invention as set forth below.

In general, in a strand tension-controlling and spool release actuator mechanism according to the invention, a first compression spring is fitted coaxially around the actuator rod between the guide block and a fixed flange, and a second compression spring is fitted coaxially around the actuator rod between the fixed flange and the slide means. When, a moving strand from said spool is trained around the movable strand guide and is progressing towards a "work center" of the strand fabricating machine, tension increase will move the slide means relative to the fixed flange on the actuator rod so that the actuator rod will engage and move the control flange to release the frictional force against rotation of said spool. The first and second compression springs will coact to provide a smoother, more even, or steadier increase in strand tension as the actuator rod moves into a position to engage and move the control flange.

DESCRIPTION OF THE DRAWING

The drawing is a view in elevation of a strand tension-controlling and spool release actuator mechanism according to the invention.

DETAILED DESCRIPTION OF THE INVENTION

A strand tension-controlling and spool release actuator mechanism according to the invention is indicated generally by the numeral 40.

An actuator mechanism 40 is used with a strand fabricating or braiding machine, as disclosed in U.S. Pat. No. 3,756,533. With parenthetical reference to the numerals of the disclosure of U.S. Pat. No. 3,756,533 a braiding machine (10) has a structural frame with support members (11) for floor mounting. The machine (10) includes a braiding mechanism (12), a drive housing (14), a control box (15), a capstan support housing (16), a capstan (17), an interior braiding point retainer (18), and an exterior braiding point retainer (19). The "work center" of the machine (10) is in the area between the interior and exterior retainers. The braiding mechanism (12) includes a set of spools indicated generally by the numeral 20. A material strand from each spool 20 is let off toward the "work center." The strands are subjected to tension by the capstan (17) and are braided as to each other or around a core member (21) introduced coaxially of the braiding mechanism (12).

Referring to the Drawing, a spool 20 is carried by a spool holder, indicated generally by the numeral 22, having a base 23 adapted for mounting on the braiding mechanism (12) of a machine (10). A spool holder 22 has a spindle 24 extending from the base 23. The spindle 24 may be fixed or rotationally mounted in relation to the base.

A spool release mechanism, referred to generally by the numeral 25, is housed within the base 23, coaxially of the spindle 24.

The spool release mechanism 25 has means within the base 23 for retarding rotation of the spool 20 on the spindle 24, which means is actuated by selective rotational movement of a control flange 32 projecting laterally of the base 23. For such further details as are necessary to understand the operation of the spool release mechanism 25, reference may be made to the related U.S. Pat. No. 3,757,904.

The base 23 has a deck 39 projecting laterally from the spindle 24. The mechanism 40 has a support rod 41 carried by the deck 39 and extending parallel to the spindle 24. A slide block 42 carrying a strand guide 43 is mounted for movement along the support rod 41. A first resilient means 44 applies a bias or force for downward movement of the slide block 42 along the support rod 41 after the spool 20 has been released.

The actuator mechanism 40 further has a guide block 45 attached to the support rod 41 above the deck 39 and carrying a reciprocating actuator rod 50. The actuator rod 50 extends from the guide block 45 and into the deck 39 to intersect and engage the spool control flange 32. A very slight upward movement of the actuator rod 50 will release the frictional locking force against rotation of the spool 20. A very slight downward movement of the actuator rod 50 will initiate development of the frictional locking force.

The actuator rod 50 has a fixed flange or collar 53 thereon below the guide block 45.

A stationary strand guide 56 is located adjacent to guide block 45 and generally medially of a spool 20 of strand material.

As shown, the support rod 41 is removably inserted into a bore 58 through the deck 39 and secured, as by a set screw or pin 59. The movable strand guide 43 for imparting a tension-control force may be a flanged roller rotatably mounted on a spindle 62.

The first resilient means 44 may be, as shown, a compression spring 63 carried coaxially around a support rod 41 and seated between the upper surface of the slider block 42 and the under surface of the guide block 45. Alternatively, the resilient means 44 could be a tension spring (not shown) extending between an attachment on the deck 39 and a connector on the slider block 42. In any event, the invention requires that a biasing force be applied to the slider block 42 after the spool 20 has been released.

The guide block 45 may be a generally rectangular element secured to the support rod 41, as by a set screw or pin 66. The upper end of the actuator rod 50 is received within a bore 67 in the guide block 45.

The actuator mechanism 40 is characterized in that a first compression spring 68 is carried coaxially around the actuator rod 50 and seated between the guide block 45 and the upper surface of the control flange 53. A second compression spring 88 is carried coaxially around the actuator rod 50 and seated between the under surface of the flange 53 and the upper surface of the slider block 42.

When a strand of material from the spool 20 is trained around the stationary guide 56 and then around the movable strand guide 43 and is progressing towards the "work center" of the machine (10), the spool 20 will rotate against the frictional locking force being developed by the mechanism 25. Simultaneously, the various elements of the mechanism 40 will maintain control of, and react during development of, tension on the strand. The compression strengths of the springs 68 and 88, relative one to the other, are so chosen that as the strand tension is increased, the slider block 42 will begin to move toward the fixed flange 53 on the actuator rod 50. However, the compression springs 68 and 88 will coact during this movement to provide a smooth, even and steady increase in strand tension as the actuator rod 50 moves into a position to engage and move the control flange 32 of the mechanism 25.

What is claimed is:

1. A strand tension-controlling and spool release actuator mechanism for a spool holder having a base adapted for mounting on a strand fabricating machine with a "work center," a spindle extending from said base for carrying a spool of strand material, a deck projecting laterally of the spindle, and a spool release mechanism having means within the base for retarding rotation of the spool on said spindle, which means is actuated by selective rotational movement of a control flange projecting laterally of said base, said actuator mechanism further having a support rod carried by said deck and extending parallel to said spindle, a slide means moveable along said support rod and carrying a strand guide, and a first resilient means biasing said slide means for movement along said support rod, said actuator mechanism further having a guide block attached to said support rod above said deck and carrying a reciprocating actuator rod having a fixed flange thereon below said guide block and in position to be actuated by said slide means, said actuator rod extending from said guide block to intersect and engage said control flange of the spool release mechanism, characterized by having, a first compression spring fitted coaxially around said actuator rod between and engaging said guide block and said fixed flange, and a second compression spring fitted coaxially around said actuator rod between and engaging said fixed flange and said slide means, whereby, a moving strand from said spool, when trained around said movable strand guide and then progressing towards a "work center" of said strand fabricating machine, will move said slide means relative to said fixed flange on the actuator rod so that said second compression spring will move said actuator rod to engage and move said control flange to release the frictional force against rotation of said spool, said first and second compression springs coacting to provide a smoother increase in strand tension as said actuator rod moves into a position to engage and move said control flange.

* * * * *